2,217,730

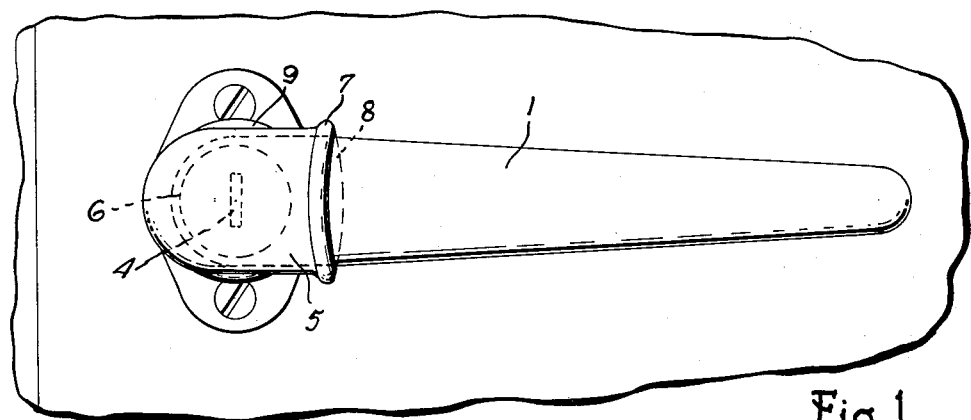
Fig. 1.
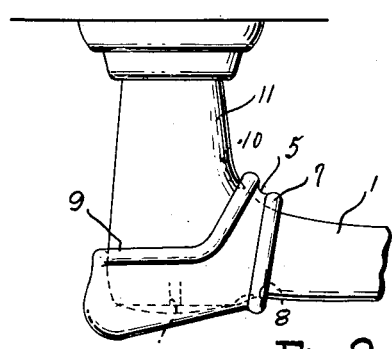
Fig. 2.
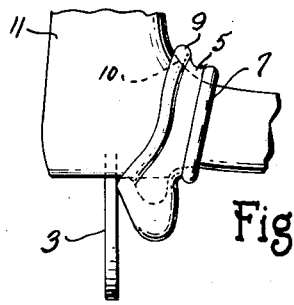
Fig. 3A.
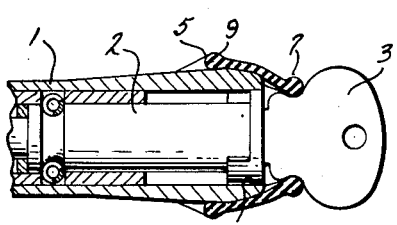
Fig. 4.
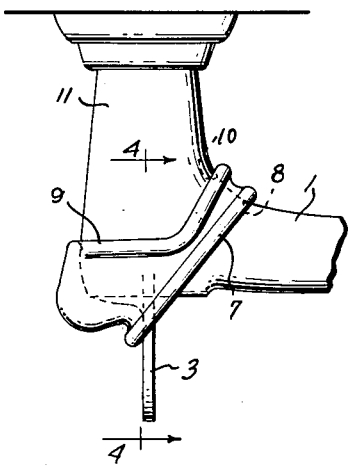
Fig. 3.
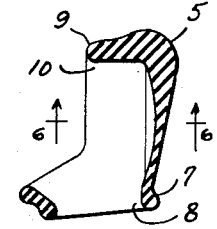
Fig. 6.
Fig. 5.
INVENTOR.
Floyd A. Cooley
BY Barnes, Kisselle, Laughlin & Raisch
ATTORNEYS Oct. 15, 1940.  F. A. COOLEY  2,217,730
CAP FOR AN AUTOMOBILE OUTSIDE DOOR LOCKING HANDLE
Filed Sept. 14, 1937    2 Sheets-Sheet 2
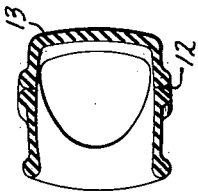
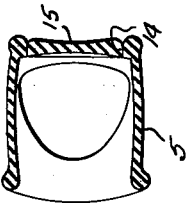
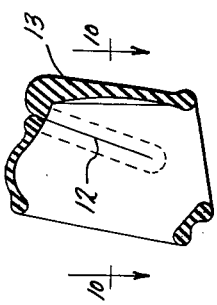
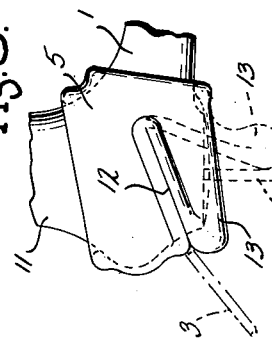
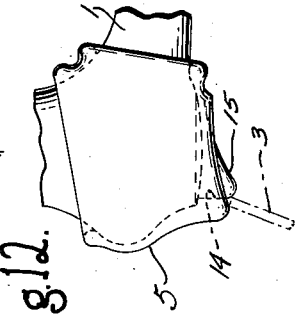
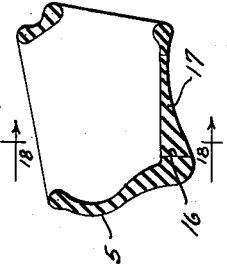
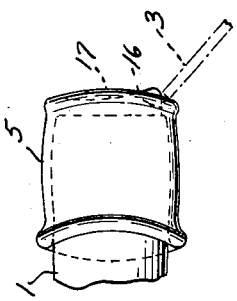
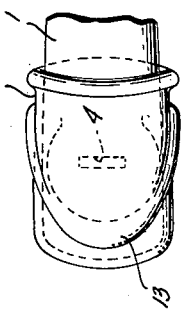
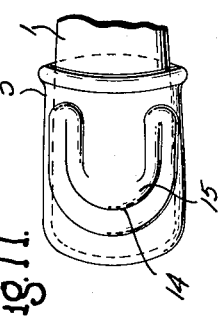
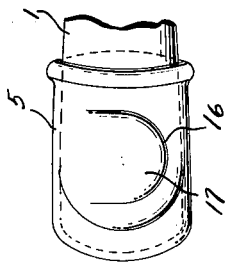
INVENTOR.
Floyd A. Cooley
BY Barnes, Kisselle, Laughlin & Raisch
ATTORNEYS Patented Oct. 15, 1940

UNITED STATES PATENT OFFICE 2,217,730

CAP FOR AN AUTOMOBILE OUTSIDE DOOR LOCKING HANDLE

Floyd A. Cooley, Detroit, Mich., assignor to Ternstedt Manufacturing Company, Detroit, Mich., a corporation of Michigan Application September 14, 1937, Serial No. 163,830

5 Claims. (Cl. 70—455)

This invention relates to a cover for an automobile outside door locking handle.

It is the object of this invention to produce a neat cover for an automobile outside door locking handle which will efficiently bar the entry of water, dirt and foreign substances from the cylinder lock, which can be easily manipulated to insert the key in the cylinder lock, and which will also serve as a bumper for cushioning the impact of the door handle against anything it may bump.

In the drawings:

Fig. 1 is a front elevation showing the cover assembled to an automobile outside door locking handle, and Fig. 2 is a top plan view of the same.

Fig. 3 is a view similar to Fig. 2 showing the key inserted in the keyhole.

Fig. 3A is a view similar to Fig. 3 showing the key inserted in the keyhole.

Fig. 4 is a section along the line 4—4 of Fig. 3.

Fig. 5 is a horizontal section through the cover.

Fig. 6 is a section along the line 6—6 of Fig. 5.

Fig. 7 is a front elevation.

Fig. 8 is a top plan view, and

Figs. 9 and 10 are sectional views of a modified form of cover.

Fig. 11 is a front elevation,

Fig. 12 is a top plan view, and

Figs. 13 and 14 are sectional views of a second modified form of cover.

Fig. 15 is a front elevation,

Fig. 16 is an end elevation, and

Figs. 17 and 18 are sectional views of a third modified form of cover.

Referring more particularly to the drawings there is shown an automobile outside door locking handle 1 having the usual cylinder lock 2 operated by the key 3 which is inserted in the keyway 4.

The entry of water, dirt and other foreign substances through the key opening 4 into the cylinder lock produces undesirable well-known results such as freezing of the water in the winter, rusting of the lock parts, and other results all of which make the lock inoperative. For barring the entry of water, dirt and other foreign substances from the keyway 4 it is proposed to mount a cover 5 upon the handle 1 which effectively seals not only the keyway 4 but also the joint 6 between the cylinder lock and opening therefor in the handle 1 against water and dirt.

In the principal form, as well as the modified forms, the cover 5 is made from any suitable elastic substance and preferably soft elastic rubber. The cover is molded so that the inside conforms to the contour of the handle 1 and preferably the inside dimension of the cover 5 is somewhat less than the outside dimensions of the portion of the handle 1 which it covers. This insures a tight fit between the cover and the handle. Further, the walls of the cover 5 are thin so that, owing to the tight fit with the handle, the cover really forms an elastic scalp for the handle 1. Preferably the cover 5 is provided with a beaded edge 7 about the periphery of the opening 8 through which the handle 1 projects and a similar beaded edge 9 about the opening 10 through which the shank 11 projects.

To insert the key 3 in the opening 4 the cover may be peeled back by hand to the position shown in Fig. 3, thus permitting the key to be inserted in the keyway 4. The cover can also be stretched or peeled back by inserting the key 3 through opening 8 between the handle 1 and the cover and using the key as a lever for stretching or peeling back the cover 5 to the position shown in Fig. 3 which permits entry of the key into the keyway 4. Upon removal of the key, the cover 5, due to the elasticity of the rubber, snaps back to the position shown in Fig. 2 where it effectively seals the key opening 4 and joint 6 against moisture and dirt. Similarly, the key may be inserted through the opening 10, as shown in Fig. 3A, after the cover has been peeled back from normal position shown in Fig. 2.

In Figs. 7 through 10 the cover 5 is provided with a U-slit 12 in its top, bottom and end walls. This U-slit 12 forms an elastic flap 13 which can be swung back to the dotted line position shown in Fig. 8 either by hand or by means of the key 3 to permit insertion of the key into the keyway. Removal of the key permits the flap 13 to automatically return to its original position effectively covering and sealing the keyway 4 and joint 6 against moisture.

In Figs. 11 through 14 the front wall of the cover 5 is provided with a U-slit 14 which forms a flap 15. The flap 15 also can be opened either by hand or by insertion of the key through the slit 14 to permit insertion of the key in the keyway. The flap 15 being elastic, upon removal of the key, returns automatically to its original sealing position.

In Figs. 15 through 18 the front wall of the cover 5 is provided with a slit 16 similar to slit 14. However, slit 16 is cut so that the flap 17 formed by the slit swings up and down about a horizontal axis whereas the flap 15 swings in and out about a vertical axis. Otherwise operation of the flap 17 is identical with that of the flap 16.

I claim:

1. A cover for a door handle and lock having an opening adapted to receive a key comprising a thin walled elastic rubber scalp having an opening through which the handle shank projects and an opening through which the handle grip projects, said scalp having a skin-tight fit with said handle and shank to seal the same and said lock against moisture, dirt and the like, said elastic scalp having a vertical wall portion which normally has a skin-tight fit against the handle and which can be drawn away from said handle by stretching the second mentioned opening and enlarging the same to uncover the key opening whereby the lock key can be inserted in the key opening through said enlarged opening, said wall portion automatically snapping back to its original sealing position with the handle and lock, a portion of the scalp between said openings being formed of greater thickness than the wall portion whereby to provide a resilient cushion on said door handle.

2. A cover for a door handle and lock having an opening adapted to receive a key comprising a thin walled elastic rubber scalp having an opening through which the handle shank projects and an opening through which the handle projects, said scalp having a water-tight slit in one of its vertical walls forming a door which can be drawn back to uncover the keyhole for entry of the key and which due to its inherent elasticity upon being released automatically snaps back to its original sealing position, and a portion of said rubber scalp adjacent said water-tight slit being formed of considerably greater thickness than the remainder of said scalp whereby to provide a resilient cushion on said door handle.

3. In a door handle comprising a stem portion, an angularly disposed handle portion, a lock located in the stem portion and a keyhole at the juncture of the stem portion and the handle portion, an elastic cover comprising a ringlet adapted to snugly circumscribe the handle portion in close proximity to its juncture with the stem portion and a cap adapted to snugly fit over the handle portion at its juncture with the stem portion to seal the same and said lock against moisture, dirt and the like, said ringlet being manually movable to expose the keyhole and permit entry of the key into the lock and which ringlet portion due to its elasticity will automatically snap back to its original sealing position when released.

4. In a door handle comprising a stem portion, an angularly disposed handle portion, a lock located in the stem portion and a keyhole at the juncture of the stem portion and the handle portion, an elastic cover comprising a ringlet adapted to snugly circumscribe the handle portion in close proximity to its juncture with the stem portion and a cap adapted to snugly fit over the handle portion at its juncture with the stem portion to seal the same and said lock against moisture, dirt and the like, said cap being manually movable to expose the keyhole and permit entry of the key into the lock and which cap due to its elasticity will automatically snap back to its original position when released.

5. In a door handle comprising a stem portion, an angularly disposed handle portion, a lock located in the stem portion and a keyhole at the juncture of the stem portion and the handle portion, an elastic cover comprising a ringlet adapted to snugly circumscribe the handle portion in close proximity to its juncture with the stem portion and a cap adapted to snugly fit over the handle portion at its juncture with the stem portion to seal the same and said lock against moisture, dirt and the like, said ringlet and cap being manually movable to expose the keyhole and permit entry of the key into the lock and which ringlet and cap due to their elasticity will automatically snap back to their original position when released.

FLOYD A. COOLEY.